(12) United States Patent
Kang et al.

(10) Patent No.: US 11,322,302 B2
(45) Date of Patent: May 3, 2022

(54) MULTILAYER ELECTRONIC COMPONENT

(71) Applicant: SAMSUNG ELECTRO-MECHANICS CO., LTD., Suwon-si (KR)

(72) Inventors: Suji Kang, Suwon-si (KR); Yuhong Oh, Suwon-si (KR); Byung Kun Kim, Suwon-si (KR); Yun Hee Kim, Suwon-si (KR); Min Jung Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 71 days.

(21) Appl. No.: 16/867,039

(22) Filed: May 5, 2020

(65) Prior Publication Data

US 2021/0166875 A1 Jun. 3, 2021

(30) Foreign Application Priority Data

Dec. 3, 2019 (KR) .................. 10-2019-0158868

(51) Int. Cl.
*H01G 4/008* (2006.01)
*H01G 4/248* (2006.01)
*H01G 4/232* (2006.01)
*H01G 4/30* (2006.01)

(52) U.S. Cl.
CPC ............ *H01G 4/008* (2013.01); *H01G 4/232* (2013.01); *H01G 4/248* (2013.01); *H01G 4/30* (2013.01)

(58) Field of Classification Search
CPC ........ H01G 4/232; H01G 2/065; H01G 4/012; H01G 4/1227; H01G 4/224; H01G 4/33; H01G 13/00; H01G 4/30; H01G 4/2325; H01G 4/008; H01G 4/0085; H01G 4/12; H01G 4/228; H01G 4/248
See application file for complete search history.

(56) References Cited

U.S. PATENT DOCUMENTS

| | | | |
|---|---|---|---|
| 2004/0190221 A1* | 9/2004 | Yamaguchi | H01G 4/30 361/306.3 |
| 2004/0256603 A1* | 12/2004 | Celik | C22C 1/0425 252/500 |
| 2007/0025056 A1* | 2/2007 | Nishikawa | H01G 4/30 361/303 |
| 2010/0008017 A1* | 1/2010 | Ito | H01G 4/012 361/301.4 |

(Continued)

FOREIGN PATENT DOCUMENTS

| | | |
|---|---|---|
| KR | 10-2013-0063235 A | 6/2013 |
| KR | 10-2016-0084217 A | 7/2016 |

*Primary Examiner* — Michael P McFadden
(74) *Attorney, Agent, or Firm* — Morgan, Lewis & Bockius LLP

(57) ABSTRACT

A multilayer electronic component includes a body including a dielectric layer and internal electrodes alternately stacked with the dielectric layer interposed therebetween, and an external electrode disposed on the body and connected to the internal electrodes. An end portion of at least one of the internal electrodes in a longitudinal direction of the body is thicker than a central portion of the internal electrode, and a ratio t2/t1 of a thickness t2 of the end portion to a thickness t1 of the central portion satisfies $1.1 \le t2/t1 \le 1.5$.

17 Claims, 3 Drawing Sheets

(56) References Cited

U.S. PATENT DOCUMENTS

| | | | |
|---|---|---|---|
| 2012/0307415 A1* | 12/2012 | Lee | H01G 4/005 361/301.4 |
| 2013/0141835 A1 | 6/2013 | Hwang et al. | |
| 2014/0240898 A1* | 8/2014 | Kim | H01G 4/30 361/303 |
| 2016/0087189 A1* | 3/2016 | Lee | H01L 41/0472 310/365 |
| 2016/0196917 A1* | 7/2016 | Lim | H01G 4/232 361/301.4 |

* cited by examiner

I–I'

'P'

MULTILAYER ELECTRONIC COMPONENT

CROSS-REFERENCE TO RELATED APPLICATION(S)

This application claims the benefit under 35 USC 119 (a) of Korean Patent Application No. 10-2019-0158868 filed on Dec. 3, 2019 in the Korean Intellectual Property Office, the entire disclosure of which is incorporated herein by reference for all purposes.

TECHNICAL FIELD

The present disclosure relates to a multilayer electronic component.

BACKGROUND

Multilayer Ceramic Capacitors (MLCCs), multilayer electronic components, are chip type capacitors mounted on the printed circuit boards of various types of electronic products, such as imaging devices such as liquid crystal displays (LCDs) and plasma display panels (PDPs), computers, smartphones, mobile phones, and the like, to charge or discharge electricity.

Such multilayer ceramic capacitors may be used as components of various electronic devices due to their small size, high capacity, and ease of mounting. As components of electronic devices have been miniaturized in recent years, demand for miniaturization and high capacitance of multilayer ceramic capacitors has increased.

To miniaturize a multilayer ceramic capacitor and increase the capacity of a multilayer ceramic capacitor, a technology for reducing the thickness of the internal electrode and the dielectric layer is required.

However, as the dielectric layer and the internal electrode are thinned, copper (Cu) diffuses toward the internal electrode during firing of the external electrode, and radiating cracks are frequently generated.

The radiating crack caused by the volumetric expansion of the internal electrode causes an increase in the short rate of the multilayer ceramic capacitor.

Radiating cracks due to the diffusion of copper (Cu) to the internal electrode are caused by the difference in the diffusion coefficient of copper (Cu) and nickel (Ni) contained in the internal electrode.

For example, according to the diffusion coefficient comparison table, it can be seen that the diffusion coefficient of copper (Cu) at 750° C. is about 100 times higher than that of nickel (Ni).

Since the diffusion coefficient of copper (Cu) and nickel (Ni) is relatively large as described above, the diffusion of copper (Cu) to nickel (Ni) is larger than that of nickel (Ni) to copper (Cu). Thus, radiating cracks are generated by volumetric expansion of the internal electrodes.

To prevent radiating cracking at the end of the internal electrode, research is being conducted to minimize the diffusion of copper (Cu) while varying the paste composition and firing conditions of the external electrode, but it is difficult to efficiently control the diffusion of copper (Cu) by the concentration gradient between firings.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a multilayer electronic component.

According to an aspect of the present disclosure, a multilayer electronic component includes a body including a dielectric layer and internal electrodes alternately stacked with the dielectric layer interposed therebetween, and an external electrode disposed on the body and connected to the internal electrodes. An end portion of at least one of the internal electrodes in a longitudinal direction of the body is thicker than a central portion of the internal electrode, and a ratio t2/t1 of a thickness t2 of the end portion to a thickness t1 of the central portion satisfies $1.1 \leq t2/t1 \leq 1.5$.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

Figure 1:
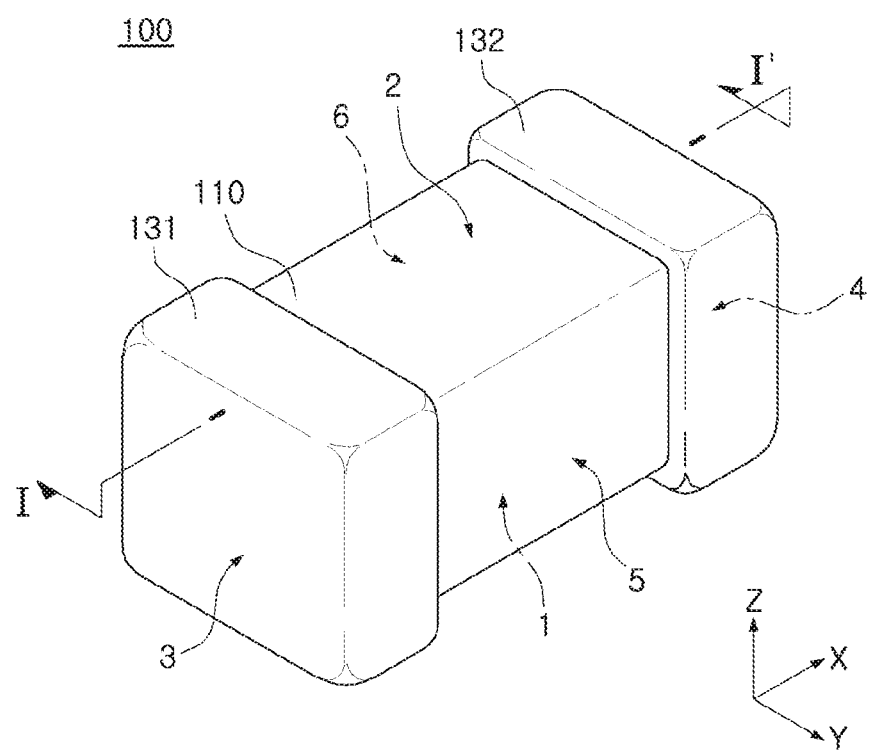
FIG. 1 schematically illustrates a perspective view of a multilayer electronic component according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to, " or "coupled to" the other element, or there may be one or more other elements intervening therebetween. In contrast, when an element is described as being "directly on," "directly connected to," or "directly coupled to" another element, there maybe no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" maybe used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

Subsequently, examples are described in further detail with reference to the accompanying drawings.

In the drawing, the X direction may be defined as the second direction, the L direction or the longitudinal direction, the Y direction as the third direction, the W direction or the width direction, and the Z direction as the first direction, the stacking direction, the T direction, or the thickness direction.

Multilayer Electronic Component

FIG. 1 is a schematic perspective view of a multilayer electronic component according to an embodiment.

Figure 2:
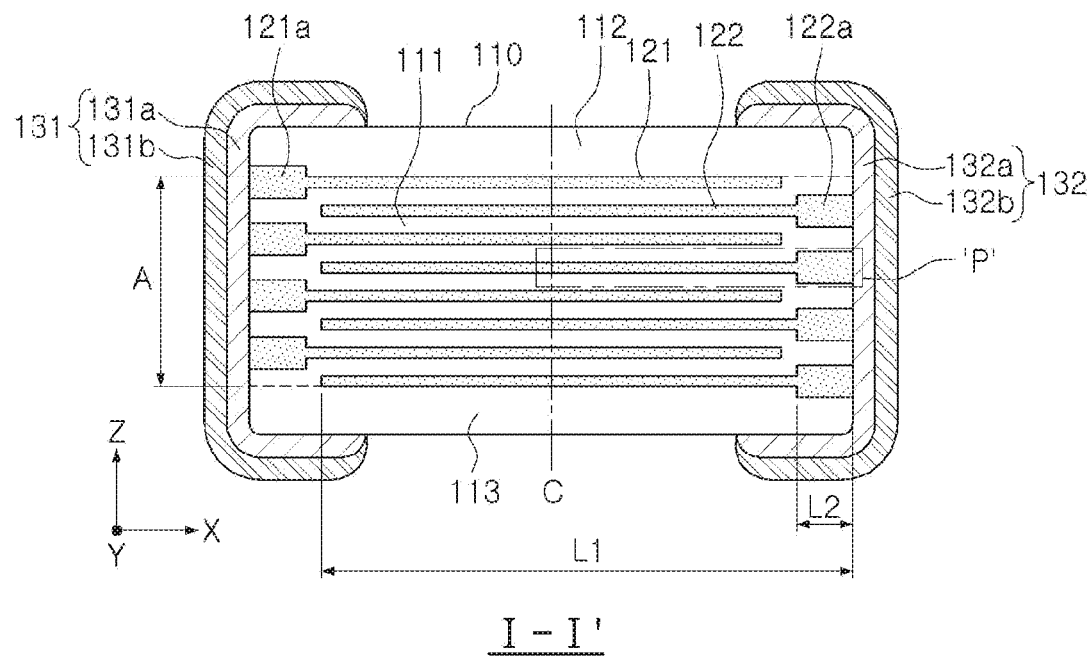
FIG. 2 is a schematic cross-sectional view taken along line I-I' of FIG. 1.

FIG. 2 is a schematic cross-sectional view taken along line I-I' of FIG. 1.

Figure 3:
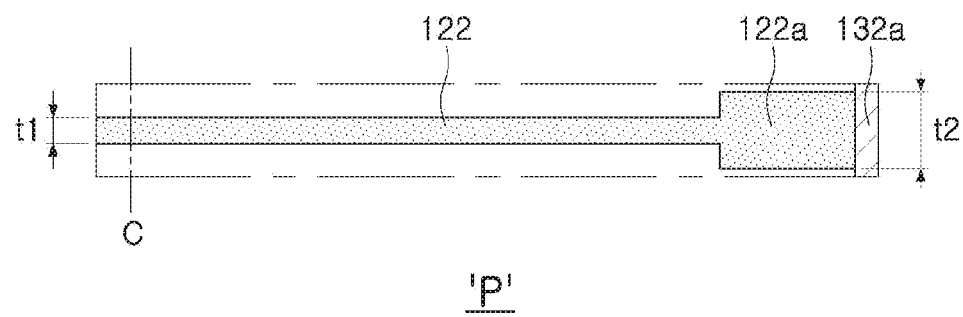
FIG. 3 is an enlarged view of area P of FIG. 2.

FIG. 3 is an enlarged view of area P of FIG. 2.

Figure 4:
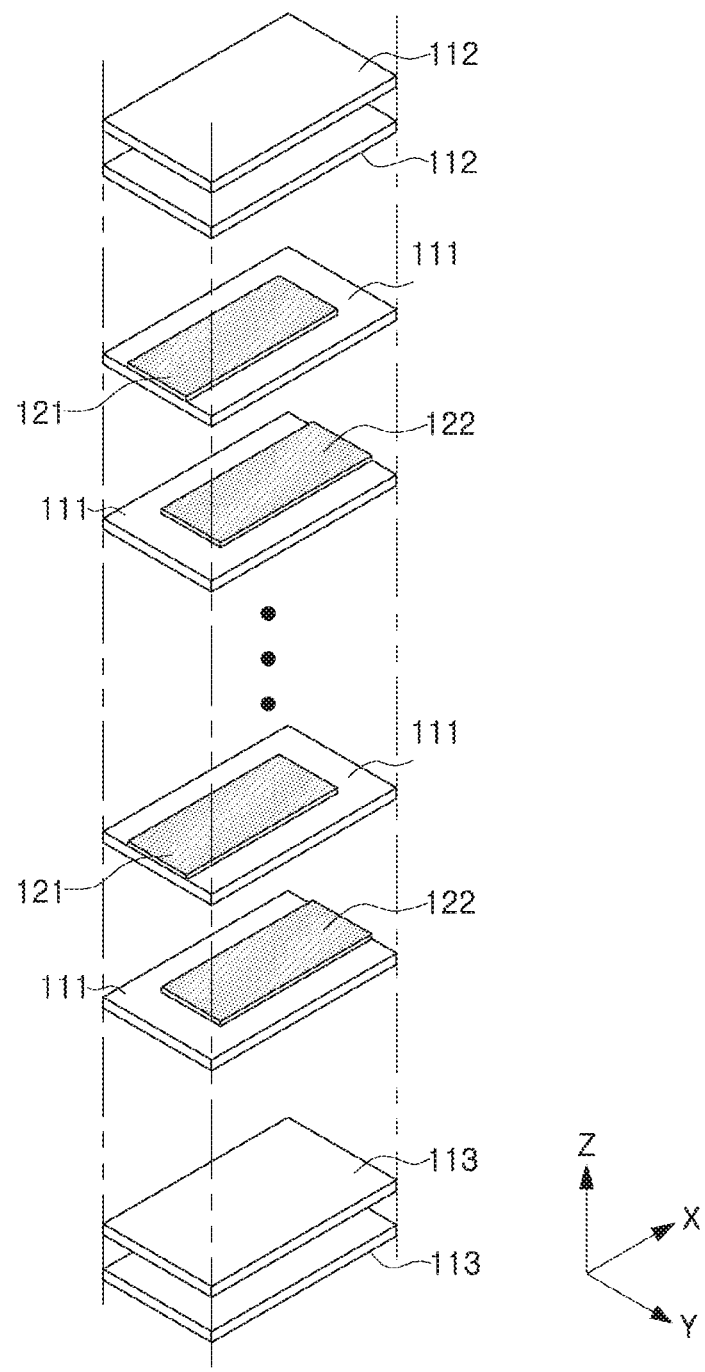
FIG. 4 is an exploded perspective view schematically illustrating a body in which a dielectric layer and an internal electrode are stacked, according to an embodiment of the present disclosure.

FIG. 4 is an exploded perspective view schematically illustrating a body in which a dielectric layer and an internal electrode are stacked.

Hereinafter, with reference to FIGS. 1 to 4, a multilayer electronic component according to an embodiment will be described in detail.

A multilayer electronic component 100 according to an embodiment may include a body 110 that includes a dielectric layer 111 and internal electrodes 121 and 122 alternately disposed with the dielectric layer 111 therebetween, and external electrodes 131 and 132 disposed on the body and connected to the internal electrodes. At least one of the internal electrodes 121 and 122 have end portions 121a and 122a having a thickness greater than that of a central portion thereof in the longitudinal direction of the body. A ratio t2/t1 of a thickness t2 of each of the end portions 121a and 122a to a thickness t1 of the central portion satisfies $1.1 \leq t2/t1 \leq 1.5$.

In the body 110, the dielectric layer 111 and the internal electrodes 121 and 122 are alternately stacked.

Although a detailed shape of the body 110 is not particularly limited, as illustrated in the drawing, the body 110 may be formed to have a hexahedral shape or the like. Due to shrinkage of the ceramic powder contained in the body 110 during the firing process, the body 110 may have a substantially hexahedral shape, although it is not a hexahedron shape having a perfect straight line.

The body 110 may have first and second surfaces 1 and 2 opposing each other in the thickness direction (a Z direction), third and fourth surfaces 3 and 4 connected to the first and second surfaces 1 and 2 and opposing each other in the longitudinal direction (an X direction), and fifth and sixth surfaces 5 and 6 connected to the first and second surfaces 1 and 2, connected to the third and fourth surfaces 3 and 4 and opposing each other in the width direction (a Y direction).

The plurality of dielectric layers 111 forming the body 110 are in a fired state, and adjacent dielectric layers 111 may be integrated with each other to a degree to which the boundaries therebetween are difficult to identify without using a scanning electron microscope (SEM).

According to an embodiment, the raw material for forming the dielectric layer 111 is not particularly limited as long as sufficient capacitance maybe obtained. For example, a barium titanate material, a lead composite perovskite material, a strontium titanate material, or the like may be used. The barium titanate-based material may include a $BaTiO_3$-based ceramic powder, and examples of the ceramic powder include $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$ in which calcium (Ca), zirconium (Zr), or the like is partially solid-dissolved in $BaTiO_3$.

As the material for forming the dielectric layer 111, various ceramic additives, organic solvents, plasticizers, binders, dispersants, and the like may be added to powder particles formed of a material such as barium titanate ($BaTiO_3$) according to the use according to an embodiment of the present disclosure.

On the other hand, a thickness td of the dielectric layer 111 need not be particularly limited.

However, in the case in which the dielectric layer is thinly formed to a thickness of less than 0.6 μm, for example, in the case in which the thickness of the dielectric layer is 0.41 μm or less, an increase in the short rate due to the radiating crack caused by the internal electrode volumetric expansion may be more frequent.

According to an embodiment of the present disclosure as described below, even when the dielectric layer and the internal electrode are very thin, since radiating cracks due to volumetric expansion of the internal electrode may be effectively prevented, the reliability of the multilayer electronic component may be improved. Thus, even in the case in which the thickness of the dielectric layer is 0.41 µm or less, sufficient reliability may be ensured.

Therefore, when the thickness of the dielectric layer 111 is 0.41 µm or less, the reliability improvement effect according to an embodiment of the present disclosure maybe more significantly increased.

The thickness td of the dielectric layer 111 may mean an average thickness of the dielectric layer 111 disposed between the first and second internal electrodes 121 and 122.

The average thickness of the dielectric layer 111 may be measured by scanning an image of the body 110 in a length and a thickness direction (L-T) cross section of the body 110 with a scanning electron microscope (SEM).

For example, with the length-thickness (L-T) cross-section cut in the center portion of the body 110 in the width direction and the longitudinal direction with respect to any dielectric layer taken from an image scanned with a scanning electron microscope (SEM), the average value may be measured by measuring the thicknesses at 30 equidistant points in the longitudinal direction.

The thickness measured at 30 equidistant points may be measured in a capacitance forming portion A indicating a region in which the first and second internal electrodes 121 and 122 overlap each other.

The capacitance forming portion A is disposed inside the body 110 and includes the first internal electrode 121 and the second internal electrode 122 disposed to face each other with the dielectric layer 111 interposed therebetween, to form capacitance. The body 110 may further include cover portions 112 and 113 formed on the upper and lower portions of the capacitance forming portion.

In addition, the capacitance forming portion may contribute to capacitance formation of a capacitor, and may be formed by repeatedly stacking the plurality of first and second internal electrodes 121 and 122 with the dielectric layer 111 interposed therebetween.

The upper cover portion 112 and the lower cover portion 113 may be formed by stacking a single dielectric layer or two or more dielectric layers on the upper and lower surfaces of the capacitance forming portion, respectively, in a thickness direction, and may serve to prevent damage to the internal electrodes from physical or chemical stress.

The upper cover portion 112 and the lower cover portion 113 may not include an internal electrode, and may include the same material as that of the dielectric layer 111.

For example, the upper cover portion 112 and the lower cover portion 113 may include a ceramic material, for example, may include a barium titanate ($BaTiO_3$)-based ceramic material.

In addition, the thickness of the cover portions 112 and 113 need not be particularly limited. However, to more easily implement miniaturization and high capacitance of the multilayer electronic component, the thickness of the cover portions 112 and 113 may be 20 µm or less.

The internal electrodes 121 and 122 are alternately stacked with the dielectric layer 111 interposed therebetween.

The internal electrodes may include first and second internal electrodes 121 and 122 respectively. The first and second internal electrodes 121 and 122 are alternately disposed to face each other with the dielectric layer 111, which constitutes the body 110, interposed therebetween, and may be exposed to the third and fourth surfaces 3 and 4 of the body 110, respectively.

Referring to FIG. 2, the first internal electrode 121 is spaced apart from the fourth surface 4 and exposed through the third surface 3, and the second internal electrode 122 is spaced apart from the third surface 3 and exposed through the fourth surface 4.

In this case, the first and second internal electrodes 121 and 122 may be electrically separated from each other by the dielectric layer 111 disposed therebetween.

Referring to FIG. 4, the body 110 may be formed by alternately stacking a ceramic green sheet on which the first internal electrode 121 is printed and a ceramic green sheet on which the second internal electrode 122 is printed, and then firing the same.

According to an embodiment, of at least one of the internal electrodes 121 and 122, the end portions 121a and 122a are thicker than the central portion of the internal electrode in the longitudinal direction of the body 110, and a ratio t2/t1 of the thickness t2 of each of the end portions 121a and 122a to the thickness t1 of the central portion of the internal electrode in the longitudinal direction of the body 110 is controlled to satisfy $1.1 \leq t2/t1 \leq 1.5$.

At least one of the internal electrodes 121 and 122 have the end portions 121a and 122a having a thickness greater than that of the center portion thereof, in the longitudinal direction of the body 110, and the ratio t2/t1 of the thickness t2 of the end portions 121a and 122a to the thickness t1 of the central portion may be adjusted to satisfy $1.1 \leq t2/t1 \leq 1.5$, thereby preventing radiating cracking and improving the reliability of the multilayer electronic component.

In general, as the dielectric layer and the internal electrode are relatively thinned, copper (Cu) diffuses to the internal electrode during firing of the external electrodes, and thus, radiating cracks are frequently generated.

The radiating crack caused by the volumetric expansion of the internal electrode causes an increase in the short rate of the multilayer ceramic capacitor.

Radiating cracks due to diffusion of copper (Cu) to the internal electrode is caused by the difference in the diffusion coefficients of copper (Cu), and nickel (Ni) contained in the internal electrode.

For example, according to the diffusion coefficient comparison table, the diffusion coefficient of copper (Cu) at 750° C. is about 100 times larger than that of nickel (Ni).

Since the difference in the diffusion coefficients of copper (Cu) and nickel (Ni) is relatively large as described above, the diffusion of copper (Cu) to nickel (Ni) is larger than that of nickel (Ni) to copper (Cu). Thus, radiating cracks are generated by volumetric expansion of the internal electrodes.

In a related art multilayer ceramic capacitor, copper (Cu) included in the external electrode is frequently diffused into the internal electrode containing nickel (Ni), which causes a large problem of volumetric expansion of the internal electrode.

In fact, in the case of a related art multilayer ceramic capacitor, when the ratio of a thickness of an end region of the internal electrode electrically connected to an external electrode in the longitudinal direction of the body, with respect to a thickness of the internal electrode measured in the central region of the body, is measured, it can be seen that the ratio exceeds at least 1.5.

As such, if the ratio of the thickness of the end region of the internal electrode in the longitudinal direction of the body to the thickness of the internal electrode measured in the central region of the body exceeds 1.5, there is a high probability that a radiating crack will occur due to the volumetric expansion of the internal electrode.

To prevent radiating cracking on the end of the internal electrode, research is being conducted to significantly reduce the diffusion of copper (Cu), while varying the paste composition and firing conditions of the external electrode, but efficiently controlling the diffusion of copper (Cu) due to concentration gradient between firings may be difficult.

However, according to an embodiment of the present disclosure, at least one of the internal electrodes 121 and 122 may have a ratio t2/t1 of the thickness t2 of the end portions 121a and 122a to the thickness t1 of the central portion, satisfying $1.1 \leq t2/t1 \leq 1.5$, thereby preventing radiating cracks to improve the reliability of the multilayer electronic component.

In an embodiment of the present disclosure, a method of satisfying the ratio t2/t1 of the thickness t2 of the end portions 121a and 122a to the thickness t1 of the central portion of the internal electrodes 121 and 122 to be $1.1 \leq t2/t1 \leq 1.5$ maybe performed by controlling the internal electrodes 121 and 122 to include a Ni—Cu alloy.

In detail, unlike the related art multilayer ceramic capacitor, the internal electrode includes a certain amount of copper (Cu) together with nickel (Ni), instead of including only nickel (Ni) as a conductive metal, thereby significantly reducing the diffusion of copper (Cu) to the internal electrode.

In detail, by adjusting the content of copper (Cu) included in the internal electrodes 121 and 122, the volumetric expansion of the end portions 121a and 122a of the internal electrodes 121 and 122 in the longitudinal direction of the body 110 may be prevented, to prevent radiating cracking.

Details of the amount of copper (Cu) included in the internal electrodes 121 and 122 will be described later.

If the ratio t2/t1 of the thickness t2 of the end portions 121a and 122a to the thickness t1 of the central portion of the internal electrodes 121 and 122 is less than 1.1, the radiating crack prevention effect is excellent, but due to the diffusion of copper (Cu) from the external electrode to the internal electrode, implementing the thickness ratio of less than 1.1 may be difficult.

On the other hand, if the ratio t2/t1 of the thickness t2 of the end portions 121a and 122a to the thickness t1 of the central portion of the internal electrodes 121 and 122 exceeds 1.5, the volumetric expansion of the internal electrode is severe similarly to the related art case. Thus, a defect of the radiating crack may occur.

In the length-thickness cross section of the body 110, the thickness t1 of the central portion and the thickness t2 of the end portions 121a and 122a of the internal electrodes 121 and 122 may mean an average thickness of each region of the stacked internal electrodes 121 and 122 in the body 110.

The thickness t1 of the central portion of the internal electrodes 121 and 122 and the thickness t2 of the end portions 121a and 122a of the internal electrodes 121 and 122 may be measured by scanning an image of the length-thickness (L-T) cross section of the body 110 with a scanning electron microscope.

For example, the thickness t1 of the central portion of the internal electrodes 121 and 122 may be obtained by a mean value provided by measuring thicknesses of respective points after determining five points including the left two points and the right two points with respect to one reference point as the center, based on the internal electrode layer point at which the center line of the body in the longitudinal direction and the center line of the body in the thickness direction meet, on a total of five internal electrode layers including upper two layers and lower two layers on the basis of one layer of the internal electrode layer at the point at which the longitudinal-direction center line and the thickness-direction center line of the body meet each other, in the internal electrode layer taken from an image provided by scanning a length-thickness (L-T) cross section of the body 110 cut at the center portion of the body 110 in the width direction with a scanning electron microscope (SEM).

For example, in the case of the thickness t1 of the central portion of the internal electrodes 121 and 122, with respect to the five internal electrode layers described above, the thickness of one point of the internal electrode layer at the point at which the longitudinal-direction center line and the thickness-direction center line of the body meet, and the thicknesses of respective two points at equidistance (500 nm each) in the left and right directions, on the basis of the one point of the internal electrode layer, are measured, the thickness t1 may be determined by the average value of the thicknesses of the total 25 points.

In the case of the thickness t2 of the end portions 121a and 122a of the internal electrodes 121 and 122, the thickness t2 may be obtained by a mean value provided by measuring thicknesses of respective two points, an end point of the internal electrode exposed in the longitudinal direction to be in contact with the external electrode and a point with the 500 nm interval inwardly from the end point, on the five internal electrode layers including upper two layers and lower two layers on the basis of one layer of the internal electrode layer at the point at which the longitudinal-direction center line and the thickness-direction center line of the body meet each other, in the internal electrode layer taken from an image provided by scanning a length-thickness (L-T) cross section of the body 110 cut at the center portion of the body 110 in the width direction with a scanning electron microscope (SEM).

For example, since the thicknesses of respective two points, an end point of the internal electrode exposed in the longitudinal direction to be in contact with the external electrode and a point with the 500 nm interval inwardly from the end point, on the five internal electrode layers taken as described above, are respectively measured, the thickness t2 of the end portions 121a and 122a of the internal electrodes 121 and 122 may be determined by the average value of the thicknesses of the total ten points.

According to an embodiment of the present disclosure, in more detail, at least one of the internal electrodes 121 and 122 may have a ratio t2/t1 of the thickness t2 of the end portions 121a and 122a to the thickness t1 of the central portion, satisfying $1.1 \leq t2/t1 \leq 1.3$.

At least one of the internal electrodes 121 and 122 satisfy a ratio t2/t1 of the thickness t2 of the end portions 121a and 122a to the thickness t1 of the central portion being $1.1 \leq t2/t1 \leq 1.3$. As a result, in the longitudinal direction of the body 110, an effect of preventing the radiating cracking by preventing volumetric expansion of the end portions 121a and 122a of the internal electrodes 121 and 122 may be more excellent.

A ratio L2/L1 of a length L2 of each of the end portions 121a and 122a of the internal electrodes 121 and 122 in the longitudinal direction of the body 110, compared to a length L1 of each of the internal electrodes 121 and 122 in the longitudinal direction of the body 110, may be 10% or less.

As described above, the length L2 of the end portions 121a and 122a of the internal electrodes 121 and 122 in the longitudinal direction of the body 110, in which volumetric expansion occurs due to the diffusion of copper (Cu) from the external electrodes to the internal electrodes, may have a length less than or equal to 10% of the length L1 of the internal electrodes 121 and 122 in the longitudinal direction of the body 110.

Since the diffusion distance of copper (Cu) from the external electrode to the internal electrode has a limitation, the copper does not diffuse deeply to the center of the internal electrode, and the ratio L2/L1 of the length L2 of the end portions 121a and 122a of the internal electrodes 121 and 122 in the longitudinal direction of the body 110, to the length L1 of the internal electrodes 121 and 122 in the longitudinal direction of the body 110, may be 10% or less.

The length L1 of the internal electrodes 121 and 122 in the longitudinal direction of the body 110, and the length L2 of the end portions 121a and 122a of the internal electrodes 121 and 122 in the longitudinal direction of the body 110, may indicate an average length of respective regions of the internal electrodes 121 and 122 stacked inside the body 110, in a length-thickness cross section of the body 110.

The thickness t1 of the central portion of the internal electrodes 121 and 122 and the thickness t2 of the end portions 121a and 122a of the internal electrodes 121 and 122 may be measured by scanning an image of the length-thickness (L-T)cross section of the body 110 with an SEM.

For example, a mean value of the length L1 of the internal electrodes 121 and 122 in the longitudinal direction of the body 110 may be obtained by measuring lengths of five internal electrode layers from an uppermost internal electrode layer in the thickness direction, five internal electrode layers taken from the center portion, and five internal electrode layers from a lowermost internal electrode layer in the thickness direction, on the internal electrode layers taken from an image provided by scanning the length-thickness (L-T) cross-section cut in the center portion of the body 110 with a SEM.

For example, since the lengths of five internal electrode layers from an uppermost internal electrode layer in the thickness direction, five internal electrode layers taken from the center portion, and five internal electrode layers from a lowermost internal electrode layer in the thickness direction, are measured, the length L1 of the internal electrodes 121 and 122 in the longitudinal direction of the body 110 may be determined by a mean value of 15 internal electrode layers.

A mean value of the length L2 of the end portions 121a and 122a of the internal electrodes 121 and 122 in the longitudinal direction of the body 110 may be obtained by measuring the lengths of the end portions 121a and 122a, in the longitudinal direction of the body 110, of five internal electrode layers from an uppermost internal electrode layer in the thickness direction, five internal electrode layers taken from the center portion, and five internal electrode layers from a lowermost internal electrode layer in the thickness direction.

For example, in the case of the length L2 of the end portions 121a and 122a of the internal electrodes 121 and 122 in the longitudinal direction of the body 110, since the lengths of the end portions 121a and 122a of the internal electrodes exposed in the longitudinal direction of the body 110 are measured with respect to the five internal electrode layers from an uppermost internal electrode layer in the thickness direction, five internal electrode layers taken from the center portion, and five internal electrode layers from a lowermost internal electrode layer in the thickness direction, the length L2 may be determined by an average value of the lengths of the end portions 121a and 122a in the longitudinal direction of the body 110.

According to the embodiment of the present disclosure, in the case of the internal electrodes 121 and 122, a distance, from both side boundary surfaces, in the thickness direction of the body 110, of the end portion 121a, 122a of the internal electrode in the longitudinal direction of the body 110, to a center of the end portion 121a, 122a of the internal electrode 121, 122 in a thickness direction of the body 110, may be respectively greater than a distance from both side boundary surfaces of the central portion of the internal electrode 121, 122 in the thickness direction of the body 110 to a center of the central portion of the internal electrode 121, 122 in the thickness direction.

As described above, the volumetric expansion of the longitudinal end potions 121a and 122a of the internal electrodes 121 and 122 is due to diffusion of copper (Cu) from the external electrode to the internal electrode. Thus, in the length-thickness cross section of the body 110 during volumetric expansion, expansion may occur in both directions rather than in one direction.

Therefore, the thickness does not increase in either direction, but the thickness of the longitudinal end portions 121a and 122a of the internal electrodes 121 and 122 may increase in both directions in the thickness direction, in the length-thickness cross section of the body 110.

For example, in the internal electrodes 121 and 122, the distance, from both side boundary surfaces, in the thickness direction of the body 110, of the longitudinal end portion 121a, 122a, to a center of the end portion 121a, 122a of the internal electrode 121, 122 in the thickness direction of the body 110, may be respectively greater than the distance from both side boundary surfaces of the central portion of the internal electrode 121, 122 in the thickness direction of the body 110 to a center of the central portion of the internal electrode 121, 122 in the thickness direction.

In an embodiment, the internal electrodes 121 and 122 may include 80.0 to 95.0 wt % of Ni and 5.0 to 20.0 wt % of Cu. Accordingly, the ratio t2/t1 of the thickness t2 of the end portions 121a and 122a to the thickness t1 of the central portion of the internal electrodes 121 and 122 may be adjusted to satisfy $1.1 \leq t2/t1 \leq 1.5$, thereby preventing radiating cracks in the multilayer ceramic capacitor to improve the reliability and the like.

If the content of copper (Cu) included in the internal electrodes 121 and 122 is less than 5.0 wt %, the content of copper (Cu) is low, and thus, effectively suppressing diffusion of copper from the external electrode to the internal electrode may be difficult. In this case, radiating cracking may increase due to volumetric expansion of the internal electrode.

In detail, when the content of copper (Cu) included in the internal electrodes 121 and 122 is greater than 10.0 wt % and 20.0 wt % or less, diffusion of copper (Cu) from the external electrode to the internal electrode may be more effectively suppressed. In addition, the effect of reducing the occurrence of radiating cracks is excellent, and the reliability may be further improved.

On the other hand, if the Cu content is more than 20.0 wt %, the shrinkage of the internal electrode in the thickness direction due to the addition of Cu is intensified, which may cause a problem of reducing the capacity of the multilayer ceramic capacitor as the internal electrode is cut off.

According to an embodiment of the present disclosure, Ni and Cu included in the internal electrodes 121 and 122 may be included in the form of Ni—Cu alloy.

By controlling the firing conditions and using Ni—Cu alloy powder, and the like, Ni and Cu included in the internal electrodes 121 and 122 may be included in an alloy form.

As Ni and Cu are included in the form of Ni—Cu alloy, the effect of Cu addition may be improved, and Cu included in the internal electrode maybe evenly distributed in the internal electrode.

According to an embodiment, the content of copper (Cu) included in the longitudinal end portions 121a and 122a of the internal electrodes 121 and 122 may be characterized by being more than the content of copper (Cu) included in the central portion of the internal electrodes 121 and 122.

In an embodiment of the present disclosure, since the internal electrode includes copper (Cu) of 5.0 wt % or more and 20.0 wt % or less, and the copper (Cu) is diffused from the external electrode to the internal electrodes 121 and 122, the content of copper (Cu) included in the longitudinal end portions 121a and 122a of the internal electrodes 121 and 122 is greater than the content of copper (Cu) included in the central portion of the internal electrodes 121 and 122.

On the other hand, the thickness of the internal electrodes 121 and 122 need not be particularly limited.

According to an embodiment, even when the dielectric layer and the internal electrode are very thin, since the cracks due to the internal electrode volumetric expansion may be effectively prevented to improve the reliability of the multilayer electronic component, sufficient reliability may be ensured even in the case in which the thickness of the internal electrodes 121 and 122 is 0.41 µm or less.

Therefore, when the thickness of the internal electrodes 121 and 122 is 0.41 µm or less, the reliability improvement effect according to an embodiment may be more significantly increased.

The thickness of the internal electrodes 121 and 122 may mean an average thickness of the internal electrodes 121 and 122.

The average thickness of the internal electrodes 121 and 122 may be measured by scanning an image of a length-thickness direction (L-T) cross section of the body 110 with a scanning electron microscope (SEM).

For example, with respect to optional first and second internal electrodes taken from an image provided by scanning an image of the length and thickness (L-T) cross-section cut at the center portion of the body 110 in the width (W) direction, with the SEM, the thicknesses of the optional first and second internal electrodes 121 and 122 may be measured at 30 points at equal intervals in the longitudinal direction to measure an average value.

The external electrodes 131 and 132 are disposed on the body 110 and connected to the internal electrodes 121 and 122.

As illustrated in FIG. 2, the first and second external electrodes 131 and 132 are disposed on the third and fourth surfaces 3 and 4 of the body 110, respectively, to be connected to the first and second internal electrodes 121 and 122, respectively.

In this embodiment, although a structure in which the multilayer electronic component 100 has two external electrodes 131 and 132 is described, the number or shape of the external electrodes 131 and 132 may vary depending on the shape of the internal electrodes 121 and 122 or other usage.

As a material of the external electrodes 131 and 132, any material may be used as long as it has electrical conductivity such as metal, and a detail material thereof may be determined in consideration of electrical characteristics, structural stability, and the like. In addition, the external electrodes 131 and 132 may have a multilayer structure.

For example, the external electrodes 131 and 132 may include electrode layers 131a and 132a disposed on the body 110 and plating layers 131b and 132b formed on the electrode layers 131a and 132a.

As a more detailed example of the electrode layers 131a and 132a, the electrode layers 131a and 132a may be firing electrodes including a conductive metal and glass, or a resin-based electrode including a conductive metal and a resin.

In addition, the electrode layers 131a and 132a may have a form in which firing electrodes and resin-based electrodes are sequentially formed on the body. In addition, the electrode layers 131a and 132a may be formed by transferring a sheet including a conductive metal onto the body, or may be formed by transferring a sheet including a conductive metal onto the firing electrode.

As the conductive metal included in the electrode layers 131a and 132a, a material having excellent electrical conductivity may be used and is not particularly limited. For example, the conductive metal may be one or more of nickel (Ni), copper (Cu) and alloys thereof.

The plating layers 131b and 132b serve to improve mounting characteristics. The type of the plating layers 131b and 132b is not particularly limited, and may be a plating layer including at least one of Ni, Sn, Pd, and alloys thereof, and may be formed of a plurality of layers.

As a more detailed example of the plating layers 131b and 132b, the plating layers 131b and 132b may be Ni plating layers or Sn plating layers, and may have a structure in which Ni plating layers and Sn plating layers are sequentially formed on the electrode layers 131a and 132a and may have a structure in which the Sn plating layer, the Ni plating layer, and the Sn plating layer are formed sequentially. In addition, the plating layers 131b and 132b may include a plurality of Ni plating layers and/or a plurality of Sn plating layers.

The size of the multilayer electronic component 100 need not be particularly limited.

However, to implement miniaturization and high capacity at the same time, the thickness of the dielectric layer and the internal electrode should be reduced to increase the number of stacked layers. Thus, in the multilayer electronic component having a size of 0402 (length×width, 0.4 mm×0.2 mm) or less, the reliability improvement effect according to an embodiment may be more increased.

Therefore, when defining a distance between the third and fourth surfaces of the body as L, and a distance between the fifth and sixth surfaces as W, the L may be 0.4 mm or less, and the W may be 0.2 mm or less. For example, a multilayer electronic component having a size of 0402 (length×width, 0.4 mm×0.2 mm) or less may be provided.

Hereinafter, a method of manufacturing the multilayer electronic component 100 according to an embodiment will be described.

First, a plurality of ceramic green sheets are prepared.

The ceramic green sheet is used to form the dielectric layer 111 of the body 110. A ceramic powder, a polymer, and a solvent are mixed to prepare a slurry, and the slurry is manufactured into a sheet having a predetermined thickness through a method such as a doctor blade.

Subsequently, an internal electrode is formed by printing a conductive paste for an internal electrode to a predetermined thickness, for example, a thickness of 0.41 µm or less, on at least one surface of each ceramic green sheet.

The internal electrode conductive paste may be formed to include 80.0 to 95.0wt % of Ni and 5.0 to 20.0 wt % of Cu. For example, Ni powder and Cu powder may be mixed, or Ni—Cu alloy powder may be included to form a conductive paste for internal electrodes.

As the printing method of the conductive paste for internal electrodes, screen printing or gravure printing may be used.

Referring to FIG. 4, a plurality of ceramic green sheets are stacked by alternately stacking a ceramic green sheet on which the first internal electrodes 121 are printed and a ceramic green sheet on which the second internal electrodes 122 are printed to be pressed from the stacking direction. Internal electrodes formed on the ceramic green sheets maybe compressed to form a laminate.

In addition, the cover portions 112 and 113 may be formed by stacking at least one ceramic green sheet on upper and lower portions of the laminate.

The cover portions 112 and 113 may have the same composition as the dielectric layer 111 positioned inside the laminate, and have a difference from the dielectric layer 111 in that the cover portions 112 and 113 do not include internal electrodes.

Thereafter, the laminate is cut for each region corresponding to one capacitor and chipped, and then fired at a high temperature to complete the body 110.

Thereafter, the first and second external electrodes 131 and 132 may be formed to cover exposed portions of the first and second internal electrodes exposed on both sides of the body 110 to be electrically connected to the first and second internal electrodes.

At this time, the surface of the first and second external electrodes 131 and 132 may be plated with nickel or tin if necessary.

EXAMPLES AND COMPARATIVE EXAMPLES

In the sample chip including the internal electrode formed by using the conductive paste for internal electrodes in which Cu was added at a certain ratio, Comparative Example without Cu and Examples 1 to 4 in which Cu was added at a predetermined ratio were compared with respect to the thickness ratio of the end portion to the central portion and the short ratio accordingly.

In the comparative example, Cu was not added to the conductive paste for the internal electrode, and the average thickness ratio of the end portion to the central portion was measured as 1.56. In this case, the short rate was 30%, indicating that the defect rate was high and the reliability was lowered.

Samples 1 to 4 are examples 1 to 4 of the present disclosure, respectively containing 5 wt % of Cu (Example 1), 10 wt % of Cu (Example 2), 15 wt % of Cu (Example 3), and 20 wt % of Cu (Example 4) in the conductive paste for internal electrodes.

In the case of Example 1, the average thickness ratio of the end portion to the central portion was 1.42, and the short ratio was 28%, and in Example 2, the average thickness ratio of the end portion to the central portion was 1.33, and the short ratio was 20%. In this case, it can be seen that a low short rate was low to improve reliability.

Next, in Example 3, the average thickness ratio of the end portion to the central portion was 1.21, and the short ratio was 15%, and in Example 4, the average thickness ratio of the end portion to the central portion was 1.12, and the short ratio was 11%. It was found that the short rate was low and the reliability was improved.

In detail, in Examples 3 and 4, the content of copper (Cu) included in the internal electrodes 121 and 122 is greater than 10.0 wt % and 20.0 wt % or less, and diffusion of the copper from the external electrode to the internal electrode may be more effectively suppressed. Thus, it can be seen that the effect of reducing radiating crack generation is excellent and the reliability may be further improved.

As set forth above, according to embodiments, end portions of at least one of internal electrodes in the longitudinal direction of a body are thicker than the central portion of the internal electrodes, and the ratio (t2/t1) of the thickness t2 of the end portion to the thickness t1 of the central portion satisfies 1.1≤t2/t1≤1.5, thereby preventing radiating cracks to improve the reliability of the multilayer electronic component.

While this disclosure includes specific examples, it will be apparent to one of ordinary skill in the art that various changes in form and details maybe made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer electronic component comprising:
    a body including a dielectric layer and internal electrodes alternately stacked with the dielectric layer interposed therebetween; and
    an external electrode disposed on the body and connected to the internal electrodes,
    wherein an end portion of at least one of the internal electrodes in a longitudinal direction of the body is thicker than a central portion of the at least one of the internal electrodes, and a ratio t2/t1 of a thickness t2 of the end portion to a thickness t1 of the central portion satisfies 1.1≤t2/t1≤1.5, and
    wherein a content of copper (Cu) included in the end portion of the at least one of the internal electrodes is different than a content of copper (Cu) included in the central portion of the at least one of the internal electrodes.

2. The multilayer electronic component of claim 1, wherein the at least one of the internal electrodes has a ratio t2/t1 of the thickness t2 of the end portion to the thickness t1 of the central portion satisfying 1.1≤t2/t1≤1.3.

3. The multilayer electronic component of claim 1, wherein a ratio L2/L1 of a length L2 of the end portion of the at least one of the internal electrodes to a length L1 of the at least one of the internal electrodes is 10% or less.

4. The multilayer electronic component of claim 1, wherein a distance, from both side boundary surfaces, in a thickness direction of the body, of the end portion of the at least one of the internal electrodes, to a center of the end portion of the at least one of the internal electrodes in the thickness direction, is respectively greater than a distance from both side boundary surfaces of the central portion of the at least one of the internal electrodes in the thickness direction to a center of the central portion of the at least one of the internal electrodes in the thickness direction.

5. The multilayer electronic component of claim 1, wherein the at least one of the internal electrodes comprises 80.0 to 95.0 wt % of nickel (Ni) and 5.0 to 20.0 wt % of copper (Cu).

6. The multilayer electronic component of claim 5, wherein the Ni and the Cu are included in the form of a Ni—Cu alloy.

7. The multilayer electronic component of claim 5, wherein the content of copper (Cu) included in the at least one of the internal electrodes is greater than 10.0 wt % and 20.0 wt % or less.

8. The multilayer electronic component of claim 5, wherein the content of copper (Cu) included in the end portion of the at least one of the internal electrodes is greater than the content of copper (Cu) included in the central portion of the at least one of the internal electrodes.

9. The multilayer electronic component of claim 1, wherein the multilayer electronic component has a length of 0.4 mm or less and a width of 0.2 mm or less.

10. The multilayer electronic component of claim 1, wherein the at least one of the internal electrodes has a thickness of 0.41 μm or less.

11. A multilayer electronic component, comprising:
external electrodes disposed on side surfaces of a body of the component opposing each other in a length direction; and
internal electrodes having opposing polarities disposed alternately with a dielectric layer interposed therebetween in a thickness direction, each of the internal electrodes having an end portion contacting a corresponding external electrode and a central portion extending away from the end portion in the length direction,
wherein a ratio t2/t1 of a thickness t2 of at least one of the end portions portion to a thickness t1 of the corresponding central portion satisfies 1.1≤t2/t1≤1.5, and
wherein the at least one of the end portions has an upper and lower surface respectively offset from an upper and lower surface of the corresponding central portion in the thickness direction.

12. The multilayer electronic component of claim 11, wherein a ratio L2/L1 of a length L2 of the at least one of the end portions to a length L1 of the corresponding internal electrode is 0.1 or less.

13. The multilayer electronic component of claim 11, wherein at least one of the internal electrodes comprises 5.0 to 20.0 wt. % of copper (Cu).

14. The multilayer electronic component of claim 11, wherein the internal electrodes have a thickness of 0.41 μm or less.

15. A multilayer electronic component, comprising:
a body having a first external electrode disposed on a first side surface and a second electrode disposed on a second side surface opposite the first side surface in a length direction,
the body comprising:
first internal electrodes exposed through the first side surface,
second internal electrodes exposed through the second side surface, and
a dielectric layer interposed between each pair of consecutive the first and second internal electrodes, the first and second internal electrodes and the dielectric layer being stacked in a thickness direction,
wherein each of the first and second internal electrodes has an end portion that does not overlap with an adjacent internal electrode and a central portion extending away from the corresponding external electrode,
wherein a ratio t2/t1 of a thickness t2 of at least one of the end portions to a thickness t1 of the corresponding central portion satisfies 1.1≤t2/t1≤1.5,and
wherein (1) a content of copper (Cu) included in the end portion of at least one of the first or second internal electrodes is different than a content of copper (Cu) included in the central portion of the at least one of the first or second internal electrodes, or (2) wherein the end portion of at least one of the first or second internal electrodes has an upper and lower surface respectively offset from an upper and lower surface of the central portion of the at least one of the first or second internal electrodes in the thickness direction.

16. The multilayer electronic component of claim 15, wherein the first and second internal electrodes comprise 5.0 to 20.0 wt. % of copper (Cu).

17. The multilayer electronic component of claim 15, wherein the first and second internal electrodes comprise a Ni—Cu alloy, wherein the Ni—Cu alloy includes copper in a range from 5.0 wt. % to 20 wt. %.

* * * * *